United States Patent [19]
Yoo

[11] Patent Number: 5,894,356
[45] Date of Patent: Apr. 13, 1999

[54] COLOR SEPARATION APPARATUS HAVING RGB COLOR FILTERS AND A THREE-LINE CCD SENSOR

[75] Inventor: Jae-hwan Yoo, Kyungki-do, Rep. of Korea

[73] Assignee: Samsung Electronics Co., Ltd., Suwon, Rep. of Korea

[21] Appl. No.: 08/686,718

[22] Filed: Jul. 26, 1996

[30] Foreign Application Priority Data

Jul. 31, 1995 [KR] Rep. of Korea ............... 95-23518

[51] Int. Cl.$^6$ ............................................. H04N 1/46
[52] U.S. Cl. .......................... 358/515; 358/518; 359/201; 359/205
[58] Field of Search ......................... 358/515, 518, 358/505, 510, 511, 509, 512, 513, 514, 474, 475, 480, 497; 382/315, 321; 359/196, 197, 201, 202, 203, 205; 348/336; 250/208.1

[56] References Cited

U.S. PATENT DOCUMENTS

| | | | |
|---|---|---|---|
| 4,709,144 | 11/1987 | Vincent | 250/226 |
| 5,003,381 | 3/1991 | Wagensonmer | 358/506 |
| 5,121,137 | 6/1992 | Taki et al. | 358/515 |
| 5,166,784 | 11/1992 | Suda et al. | 358/515 |
| 5,285,236 | 2/1994 | Jain | 355/53 |
| 5,410,347 | 4/1995 | Steinle et al. | 358/512 |
| 5,481,381 | 1/1996 | Fujimoto | 358/515 |
| 5,722,001 | 2/1998 | Nishio | 399/7 |

FOREIGN PATENT DOCUMENTS

60-127862 7/1985 Japan.

Primary Examiner—Edward L. Coles
Assistant Examiner—Madeleine AV Nguyen
Attorney, Agent, or Firm—Foley & Lardner

[57] ABSTRACT

A simple color separation apparatus includes a light source for radiating light on the document, a movable color filter set arrayed in parallel with the main-scanning direction, the movable color filter set includes filters selectively transmitting colors respectively, which separate into three colors the radiated light reflected from the document, wherein each filter has sufficient length to cover the light in the main-scanning direction and a width that prevents interference between colors of the reflected and separated light; a lens for image-forming the light transmitted by each filter of the color filter set; a three-line CCD sensor for converting the light image formed by the image-forming lens to electrical signals, wherein the three-line CCD sensor includes three lines arrayed in parallel with the main-scanning direction, each of which has a line width that is determined by the magnification of the lens; and a carriage for moving the color filter set in the sub-scanning direction. The color filter is removable to allow the color separation apparatus to perform double duty in a copier and/or scanner in color or black/white mode.

9 Claims, 7 Drawing Sheets

MAIN SCANNING DIRECTION →

FIG. 6

SUB-SCANNING DIRECTION →

SUB-SCANNING DIRECTION

COLOR SEPARATION APPARATUS HAVING RGB COLOR FILTERS AND A THREE-LINE CCD SENSOR

BACKGROUND OF THE INVENTION

1. Field of the Invention

The present invention relates to a color separation apparatus and, more particularly, to a color separation apparatus that may be used in low-priced color copiers and scanners.

2. Description of Background Art

In color copiers and scanners, there are generally two methods for separating the color of an original image being copied or scanned. One method uses a color CCD (Charge Coupled Device) sensor, and the other method uses a black-and-white (hereinafter referred to as "b/w") CCD sensor and a color separation apparatus. Color CCD sensors, however, are expensive and therefore significantly raise the component cost of color copiers or scanners that incorporate them. Accordingly, in lower-priced color copiers and scanners, b/w CCD sensors and a color separation apparatus are usually adopted for color separation.

A color separation system using a conventional b/w CCD sensor and a color separation apparatus can be further classified based upon whether a method of using R, G and B (red, green, blue) light sources, each having a different spectral distribution, or a method of using a single white light source and a color filter or a prism is used. An apparatus that employs a method that uses a prism, however, exhibits a drawback in that its structure is complicated and requires 3-line CCDs and image-forming optical systems, all of which increases the component cost of the apparatus. An apparatus that employs the method of using R, G an B light sources also exhibits a drawback in that high-speed scanning is hindered by persistence time of each light source as they are turned on and off in succession.

In an apparatus that employs a single white light source and a color filter, there are generally two methods for separating color. The first method involves arranging the filter in fixed positions, and the second method involves driving the filter to be rotated or ascended/descended in front of the sensor. However, the second method involving driving the filter requires an additional apparatus or component, e.g., a motor, for driving the filter.

To overcome these drawbacks, two different color separating methods using a fixed color filter have been proposed. The first method involves installing the color filter at a transparent glass portion where documents are loaded, as disclosed in Japanese Patent, Publication No. 60-127862, and the second method involves using a 3-line CCD and triple-layered reflection filters, as disclosed in U.S. Pat. No. 4,709,144.

Figure 1:
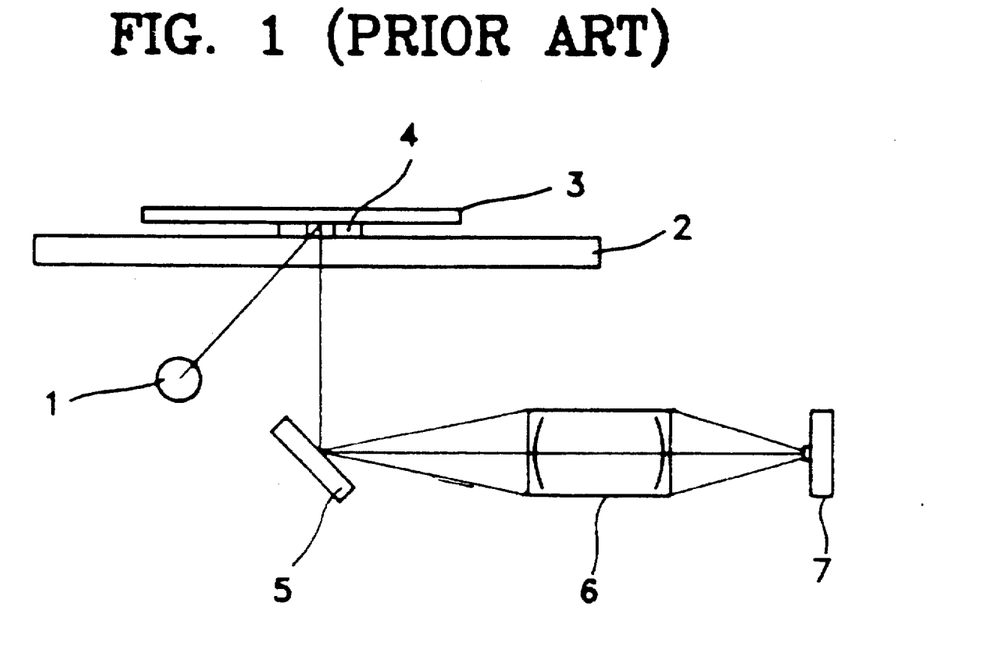
FIG. 1 is a schematic view of a prior art apparatus, wherein the structure of a conventional color separation apparatus utilizing a strip filter is shown.
Figure 2:
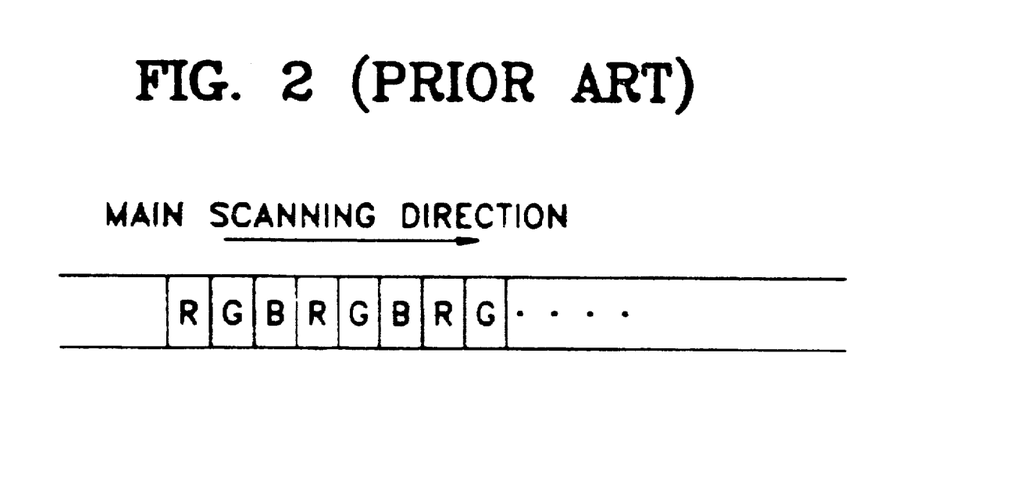
FIG. 2 shows the structure of a strip filter that is used in a prior art apparatus shown in FIG. 1.

The method disclosed in Japanese Patent Publication No. 60-127862 is depicted in FIG. 1. As seen in FIG. 1, a surface of a glass 2 where a document 3 is placed is coated with a strip filter 4. Upon illumination of the document 3 by light 1, an area of the document 3 in the reading section is selectively transmitted through the strip filter 4 so that color is separated, reflected by mirror 5, refocused by lens 6 and received by CCD sensor 7. However, as shown in FIG. 2, since sets of R, G & B color strip filters are arranged in a single line in a main scanning direction, resolution lowers to ⅓ or below compared with other conventional color separation apparatus, and high resolution scanning cannot be easily achieved.

Figure 3:
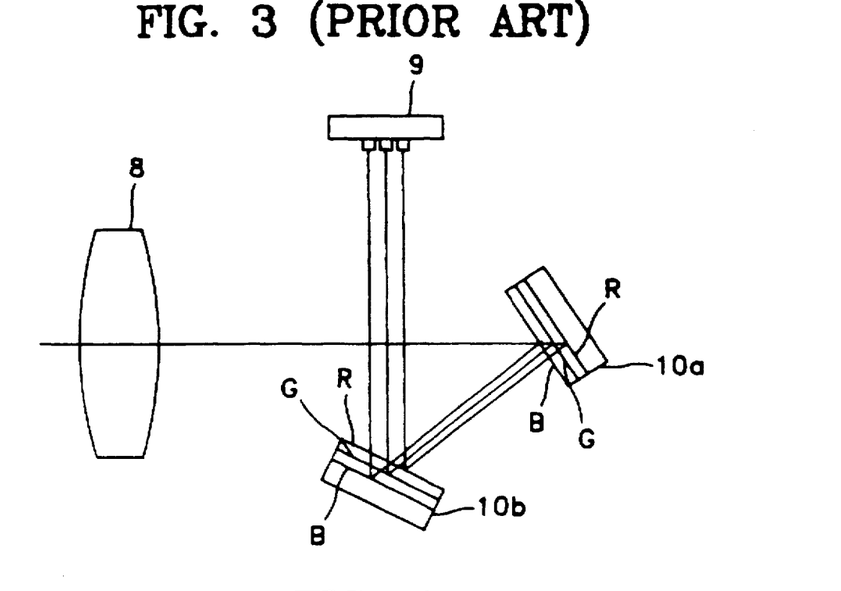
FIG. 3 is a schematic view of another prior art apparatus, wherein the structure of another example of a conventional color separation apparatus utilizing a 3-line CCD is shown.

The method disclosed in U.S. Pat. No. 4,709,144 is depicted in FIG. 3. Referring to FIG. 3, a color separation system comprises a trichromatic photosensor 9 (or 3-line CCD sensor) and reflection-type filters 10a and 10b (trichromatic beamsplitter) having glass plates and dichroic coatings R, B and G, that are suitable for high resolution scanning. In this method, however, light passing through a lens 8 is reflected from reflection-type filters 10a and 10b, respectively, and is thereafter incident on the 3-line CCD or trichromatic photosensor. Inevitably, there is a loss of energy as the light is made to pass through filters and glass plates, and this loss of energy may be compensated by increasing the power of the light source to obtain a desired final output. From the standpoint of physical and mechanical construction, since each color-separated light should be image-formed respectively on the 3-line CCD or trichromatic photosensor, and because the linear array of photosensors are disposed at predetermined intervals, exact and precise arrangement of the reflection-type filters is required.

SUMMARY OF THE INVENTION

The present invention provides a novel color separation apparatus used for low-priced color copiers and scanners and is provided with a 3-line b/w CCD sensor and a movable transmission type color filter having color filter elements.

The color separation apparatus of the present invention comprises a light source for radiating light on a document, a movable transmission type color filter having color filter elements arrayed in parallel with a main scanning direction and perpendicular to the light path for selectively transmitting the light reflected from the document, a lens for image-forming the light transmitted by the color filter, a 3-line CCD sensor for converting the light image-formed by the image forming lens to electric signals, and a first moving means for moving the transmission type color filter in a single sub-scanning direction perpendicular to the main-scanning direction.

The color filter may be attached to a filter transfer system and is removable to allow b/w copying and/or scanning. The first moving means may comprise a filter and a plurality of mirrors. The color separation apparatus may further comprise a second moving means to change the light path, as well as a color correction filter disposed between the second moving means and the image-forming lens. The three-line CCD sensor may be a monochrome sensor, and the color filter may contain red, green and blue filter elements. The image-forming lens may be a 1:1 magnification lens.

DETAILED DESCRIPTION OF THE INVENTION

Figure 4:
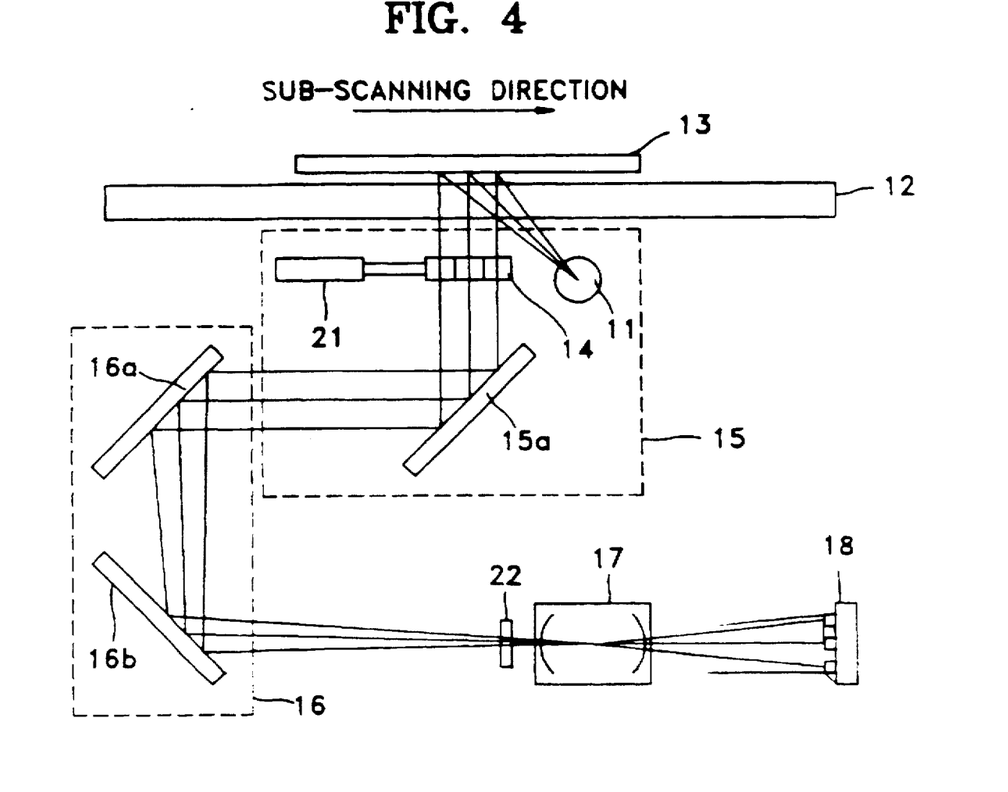
FIG. 4 is a schematic view illustrating the structure of an embodiment of a color separation apparatus having a first mirror transfer system, a second mirror transfer system and a filter transfer system in accordance with the present invention.

Referring to FIG. 4, a color separation apparatus according to the present invention comprises a light source 11 for radiating light onto a document 13, a glass 12 for loading a document 13, a filter set 14 for selectively transmitting the light reflected from the document 13, first and second mirror transfer systems 15 and 16, respectively, for changing a light path, a photoelectric conversion device 18, such as a CCD sensor, for converting light signals to electric signals, an image-forming lens 17 for image-forming the light reflected from the document 13 onto the CCD sensor 18, a filter transfer system 21 to allow the color separation apparatus to be used for b/w or color copying or scanning, and a color correction filter 22 for preventing color distortion of the color separation apparatus. The color correction filter 22 may be selected at the user's option.

A structure of one embodiment of the color separation apparatus of the present invention is shown in FIG. 4, and the operation of this embodiment may be described as follows.

Primarily, both first mirror transfer system 15 including light source 11, filter set 14 and a first mirror 15a and second mirror transfer system 16 including second mirrors 16a and 16b, move at a correlated speed with each other in order to scan document 13. Here, a transfer direction of the transfer systems that is perpendicular to the light path is a main-scanning direction while a transfer direction that is perpendicular to both the light path and the main-scanning direction is a sub-scanning direction. The driving method of first mirror transfer system 15 and second mirror transfer system 16 will now be described referring to FIGS. 11 and 12.

Figure 11:
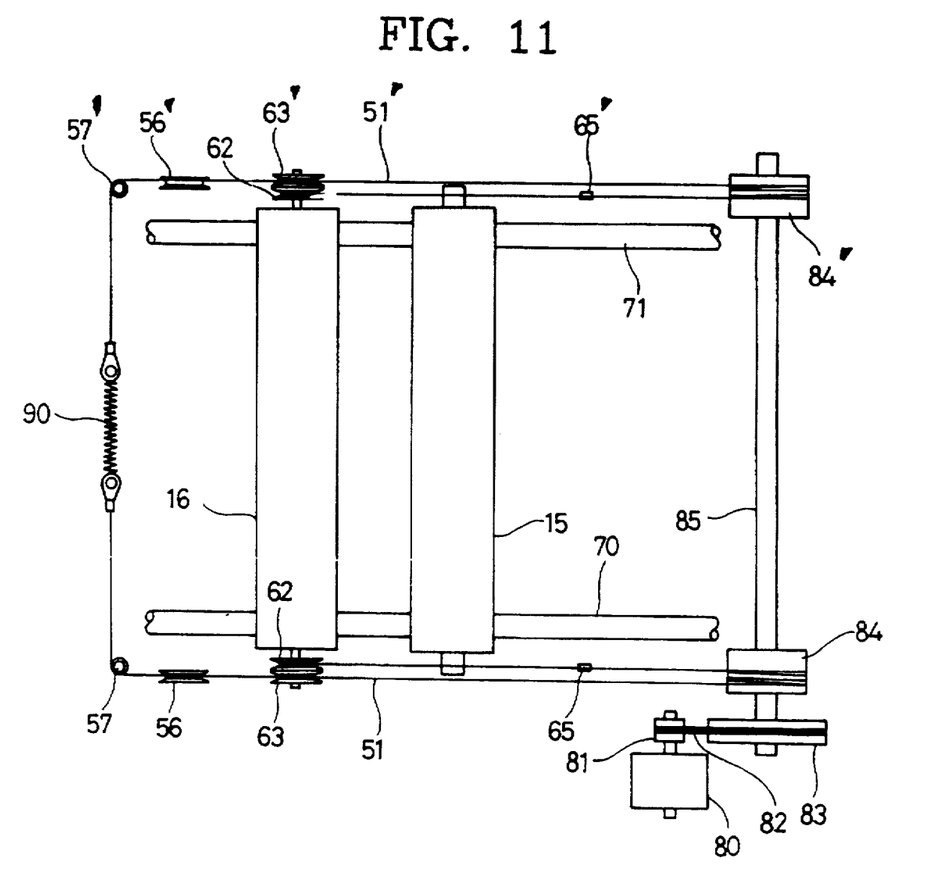
FIGS. 11 and 12 are schematic views showing the driving principle of the first mirror transfer system and the second mirror transfer system in FIG. 4.
Figure 12:
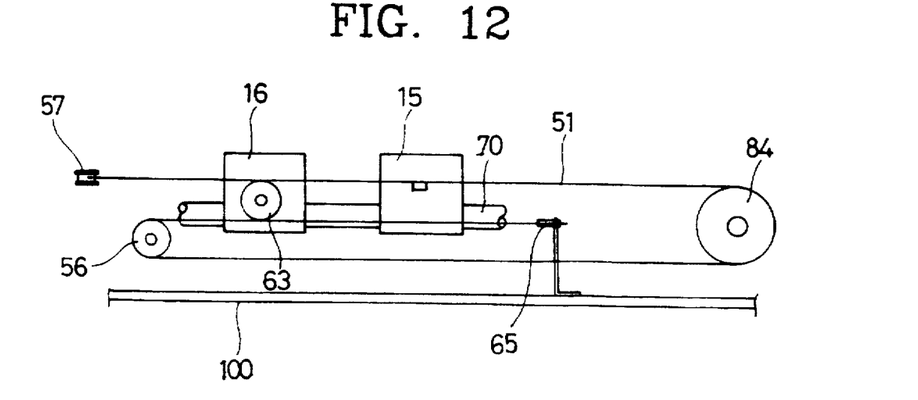

First mirror transfer system 15 and second mirror transfer system 16 are supported by guide shafts 70 and 71 and are respectively moved by virtue of being connected by wire 51 and 51' in the subscanning direction (illustrated in scanning direction in the drawing) Wires 51 and 51' are fixed to wire fixation portions 65 and 65', respectively, and wound around pulley 84 and 84' through first idle pulleys 63 and 63' of second mirror transfer system 16 and first mirror transfer system 15. Wires 51 and 51' are connected by spring 90 through idle pulley 56 and 56' attached to a scanner chassis (not shown). Tension on the two wires 51 and 51' is uniformly formed by spring 90, and first and second mirror transfer systems move in parallel with each other.

Pulleys 84 and 84' are mounted on shaft 85. A first timing pulley 83 is also mounted on shaft 85 and is operatively engaged with a second timing pulley 81 by a belt 82. The second timing pulley 81 is operatively engaged with motor 80, in this case by being mounted on a motor shaft, to enable controlled drive of wires 51 and 51' by motor 80. Motor 80 is driven by a scanner controller (not shown), and the wires 51 and 51' under controlled drive by motor 80 allow for controlled drive of the first and second mirror transfer systems 15 and 16 in a reciprocating manner. Here, since wires 51 and 51' are fixed to both first mirror transfer system 15 and wire fixation portions 65 and 65', respectively, the second mirror transfer system 16 moves at a speed of V/2 when first mirror transfer system 15 moves at a speed of V. Thus, the distance between document 13 and sensor 18 is always maintained to be uniform.

Figure 5:
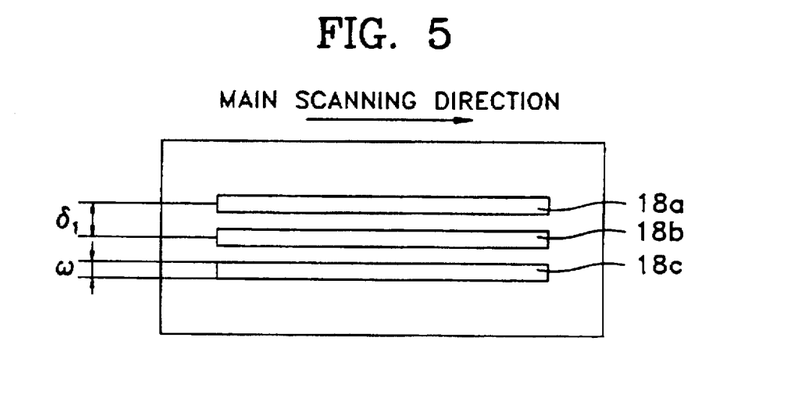
FIG. 5 shows the structure of a CCD sensor shown in FIG. 4.

The 3-line CCD sensor 18 is comprised of three lines of photosensitive elements 18a, 18b and 18c, as shown in FIG. 5, and the interval between the lines and the width of each line are $\delta_1$ and $\omega$, respectively. In CCD sensor 18, the three lines of photosensitive elements 18a, 18b and 18c are arrayed in parallel with the main scanning direction. The line width $\omega$ of each photosensitive element 18 in CCD sensor 18 is determined by the magnification m of a lens and can be determined by the following expression (1).

$$\omega = \text{magnification (m)/resolution (1p/mm)}. \tag{1}$$

Figure 8:
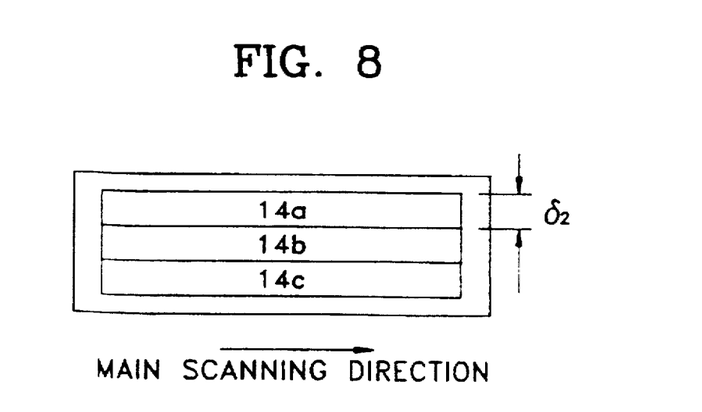
FIG. 8 shows a structure of a filter of the present invention.

On the other hand, the interval $\delta_1$ between the lines serves as a factor in determining a width $\delta_2$ of the color separation filter set (14 of FIG. 4) shown in FIG. 8.

Color separation filter set 14 is arrayed in parallel with a sensor line as shown in FIG. 8. The filter has a combined arrangement of three R, G and B colors for the separation of the three colors. The width $\delta_2$ of the filter can be expressed as the following expression (2).

$$\delta_1 = \delta_1/\text{magnification (m)}. \tag{2}$$

Figure 6:
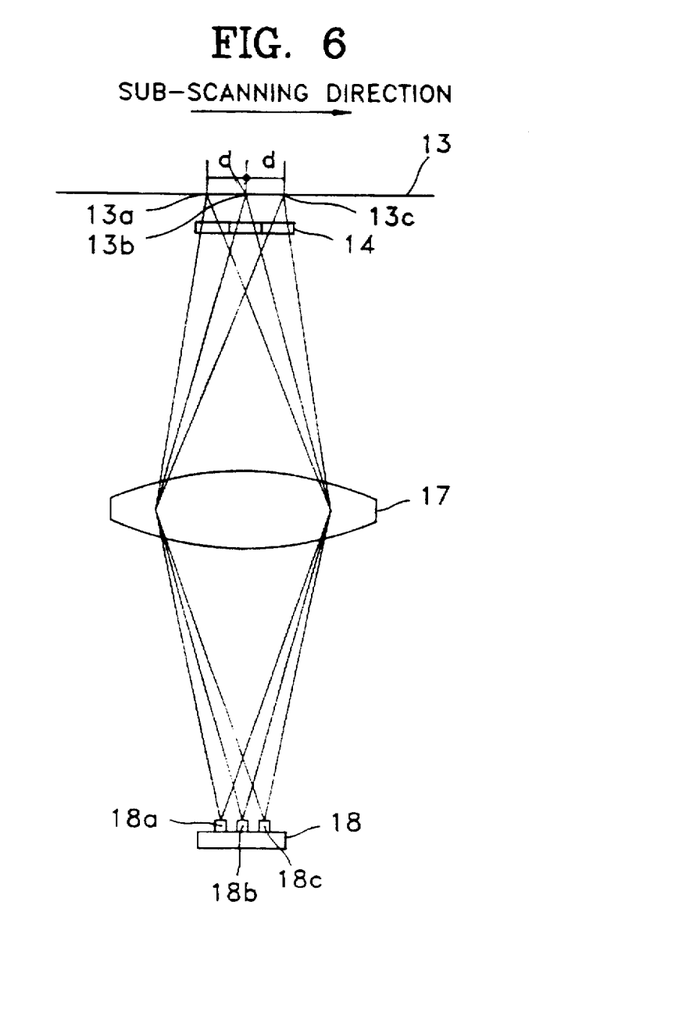
FIG. 6 is an illustration showing the principle of 3-line image-forming

FIG. 6 schematically shows the principle of color separation in the color separation apparatus of the present invention. Referring to FIG. 6, three lines 13a, 13b and 13c, each being arrayed with an interval d in the sub-scanning direction on document 13, are correspondingly image-formed on pixel lines 18a, 18b and 18c of CCD sensor 18 by an image-forming lens 17, respectively. Here, color separation filter set 14 is disposed at an arbitrary position between document 13 and image-forming lens 17, or image-forming lens 17 and CCD sensor 18, and selectively transmits the light reflected from each line of document 13 as three colors, R, G & B.

Figure 7:
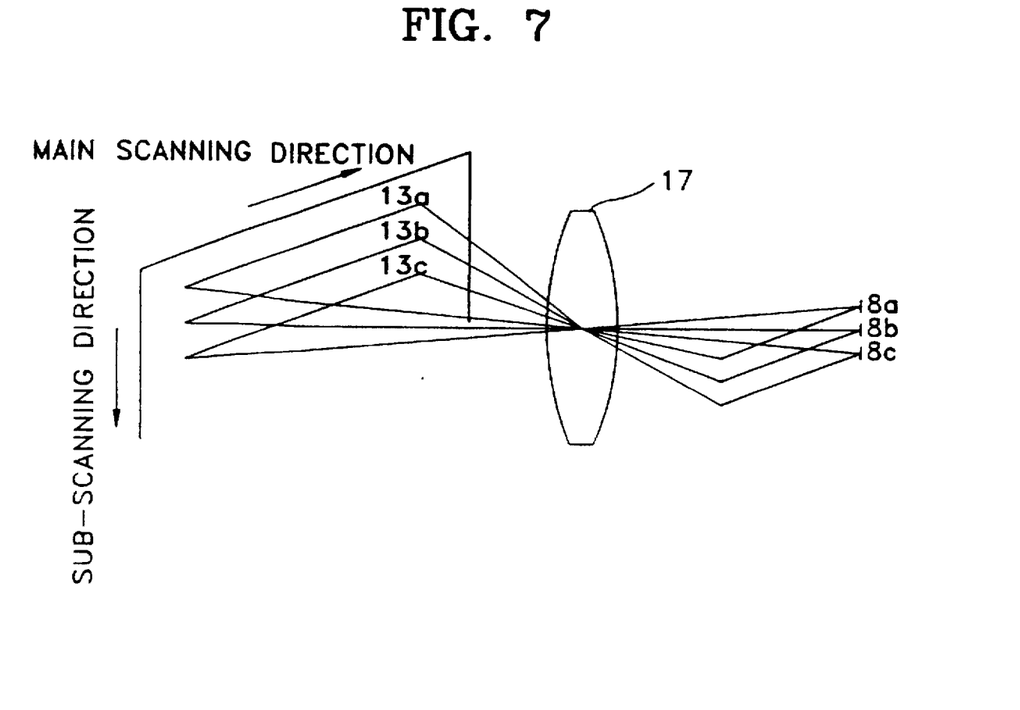
FIG. 7 is an illustration showing the principle of color separation in the present invention.

The principle of image-forming the three lines in the sub-scanning direction in the document on CCD sensor 18 is shown in FIG. 7. Here, the length of each color filter 14a, 14b and 14c in color separation filter set 14 is made to be sufficient enough to cover the light rays in the main scanning direction, and the width 62 of the filter is determined so as to not allow reflected light rays to interfere with other color rays as shown in FIG. 6.

Since the output image signals from CCD sensor 18 contain information on positions being different from each other with respect to the R, G & B colors, a correction is made to output R, G & B color information of the same line at an output port.

On the other hand, since color separation filter set 14 can be inserted or removed by filter transfer system 21, the image information of the document can be processed as b/w signals by selecting one signal among the 3-line signals of the sensor. Accordingly, the color separation apparatus of the present invention can be used in a copier or scanner that can serve double duty as a processor of both color or b/w images.

The configuration and driving method of a filter driving system will now be described with reference to FIGS. 13 and 14.

Figure 13:
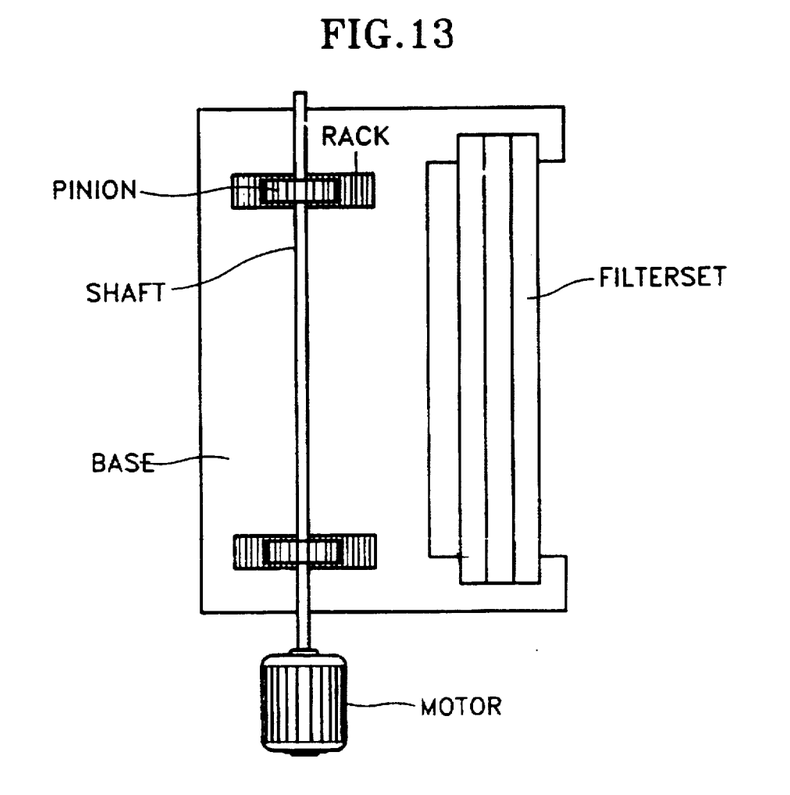
FIGS. 13 and 14 are schematic views showing the structure and the driving principle of the filter transfer system in FIG. 4.
Figure 14:
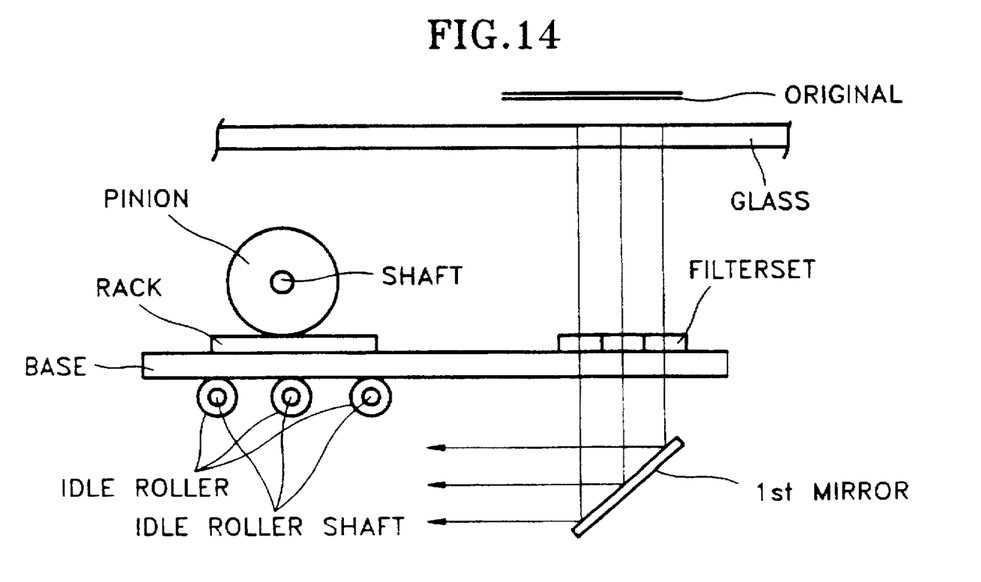

A filter driving system is constructed as shown in FIGS. 13 and 14. The filter is driven based on the principle of a rack and pinion, and a rack gear and the filter set are attached to the base thereof. The base is supported by idle rollers and moves along a guide (not shown) on a plane perpendicular to an optical path input to the filter set. The pinion gear is mounted on a shaft, and the shaft is connected to a motor. The motor and idle roller shafts are fixed to and supported by the first mirror transfer system 15. Under the control of the scanner controller, the motor drives the the pinion mounted on motor shaft.

The pinion is operatively engaged with rack, in this case by gear teeth, and the rack is mounted static to the base. This arrangement allows for horizontal movement of the base in parallel with the scanning direction in a reciprocating manner under the control of the scanner controller and, thereby, allows for the controlled insertion and removal of the filter set from the optical path.

The base moves along the guide, and the filter driving system fixed to first mirror transfer system 15 moves therewith. That is, by driving the motor according to the selection of a B/W or color mode in the scanner controller, the filter set is removed from or inserted in the optical path to thereby scan an image in the B/W mode or color mode, respectively.

Figure 9:
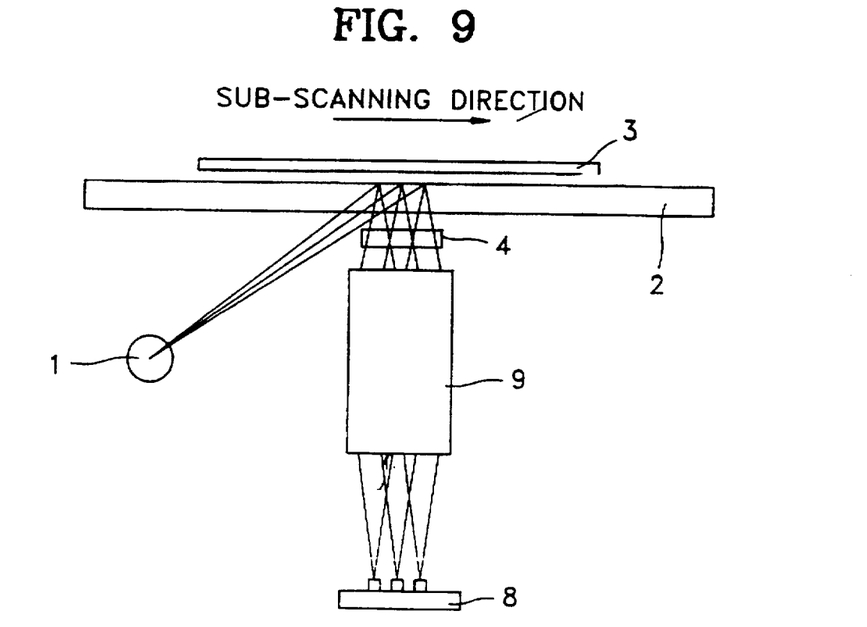
FIG. 9 is a schematic view of an embodiment of the present invention, wherein the color separation apparatus is applied with a 1:1 magnification level of the image-forming system.
Figure 10:
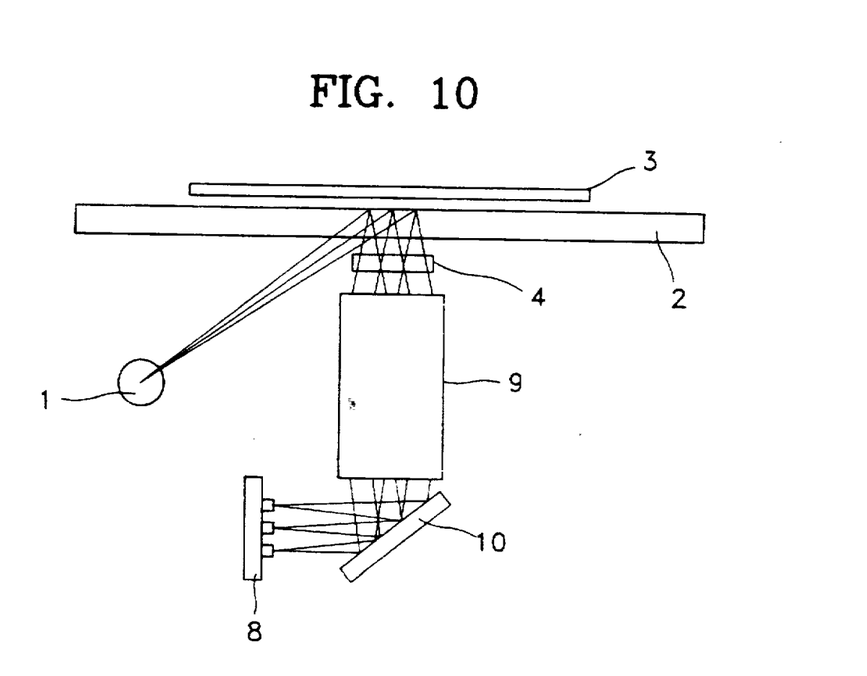
FIG. 10 is a schematic view of another embodiment of the present invention, wherein the color separation apparatus is applied with a 1:1 magnification level of the image-forming system.

FIG. 9 shows a first embodiment of the color separation apparatus employed in a 1:1 magnification image-forming optical system utilizing an SLA (selfoc lens array) 9. FIG. 10 shows a second embodiment of the color separation filter using a reflection type filter system which subjoins a reflection mirror 10 as well as a transmission type filter 4 of FIG. 9.

As described above, the color separation apparatus according to the present invention uses a 3-line CCD and a R, G & B color filter so that the structure of the apparatus is rendered simple and also to maintain manufacturing costs at a relatively low level. Also, the color separation apparatus of the present invention may perform double duty in either color and b/w applications by the simple insertion or removal of the color filter.

Further, since thin filters such as gelatin can be used as color filters, there is no optical path length and low cost filters are achieved.

What is claimed is:

1. A color separation apparatus for separating color from an image on a document, wherein a sub-scanning direction is defined as a direction of scanning the document and a main-scanning direction is defined as a direction perpendicular to the sub-scanning direction, said apparatus comprising:

a light source for radiating light on the document;

a movable color filter set arrayed in parallel with the main-scanning direction, the filter set includes filters for selectively transmitting a respective color and for separating into three colors the radiated light being reflected from the document, wherein each filter has a length generally corresponding to the reflected light in the main-scanning direction and a width for preventing interference between colors of the separated reflected light;

a lens for image-forming the light transmitted by each filter of the color filter set;

a 3-line CCD sensor for converting the light image formed by the image-forming lens to electric signals, wherein the three-line CCD sensor includes three lines arrayed in parallel with the main-scanning direction, and each of the lines having a width related to a magnification of the lens; and a first mover for driving the color filter set in the sub-scanning direction.

2. A color separation apparatus as recited in claim 1, wherein the color filter set is attached to a filter transfer system.

3. A color separation apparatus as recited in claim 1, further comprising:

a second mover for changing the separated and reflected light path.

4. A color separation apparatus as recited in claim 1, wherein the three-line CCD sensor is a monochrome sensor.

5. A color separation apparatus as recited in claim 1, wherein the color filter set contains red, green and blue filters.

6. A color separation apparatus as recited in claim 1, wherein the image-forming lens is a 1:1 magnification lens.

7. A color separation apparatus for separating color from an image on a document, wherein a sub-scanning direction is defined as a direction of scanning the document and a main-scanning direction is defined as a direction perpendicular to the sub-scanning direction, said apparatus comprising:

a light source for radiating light on the document;

a movable color filter set arrayed in parallel with the main-scanning direction, the filter set includes filters for selectively transmitting a respective color and for separating into three colors the radiated light being reflected from the document;

a lens for image-forming the light transmitted by each filter of the color filter set;

a 3-line CCD sensor for converting the light image formed by the image-forming lens to electric signals; and a first mover for driving the color filter set in the sub-scanning direction wherein the first mover comprises the filters and a plurality of mirrors.

8. A color separation apparatus for separating color from an image on a document, wherein a sub-scanning direction is defined as a direction of scanning the document and a main-scanning direction is defined as a direction perpendicular to the sub-scanning direction, said apparatus comprising:

a light source for radiating light on the document;

a movable color filter set arrayed in parallel with the main-scanning direction, the filter set includes filters for selectively transmitting a respective color and for separating into three colors the radiated light being reflected from the document;

a lens for image-forming the light transmitted by each filter of the color filter set;

a 3-line CCD sensor for converting the light image formed by the image-forming lens to electric signals;

a first mover for driving the color filter set in the sub-scanning direction;

a second mover for changing the separated and reflected light path; and a color correction filter disposed between the second mover and the imaging-forming lens.

9. A color separation apparatus as recited in claim 8, wherein the color correction filter is removable.

* * * * *

UNITED STATES PATENT AND TRADEMARK OFFICE
CERTIFICATE OF CORRECTION

PATENT NO. : 5,894,356
DATED : April 13, 1999
INVENTOR(S) : Jae-hwan Yoo

It is certified that error appears in the above-identified patent and that said Letters Patent is hereby corrected as shown below:

Drawing sheet, consisting of Fig. 11, should be deleted to be replaced with the Drawing sheet, consisting of Fig. 11, as shown on the attached page.

Signed and Sealed this

Twenty-seventh Day of November, 2001

*Attest:*

*Attesting Officer*

NICHOLAS P. GODICI
*Acting Director of the United States Patent and Trademark Office*

FIG. 11

FIG. 12